(12) United States Patent
Hashimoto

(10) Patent No.: US 6,873,587 B2
(45) Date of Patent: Mar. 29, 2005

(54) SERVO WRITER

(75) Inventor: Akihiro Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 139 days.

(21) Appl. No.: 10/426,956

(22) Filed: May 1, 2003

(65) Prior Publication Data
US 2003/0231430 A1 Dec. 18, 2003

(30) Foreign Application Priority Data
May 2, 2002 (JP) ........................................ 2002-130573

(51) Int. Cl.$^7$ ............................................ G11B 21/10
(52) U.S. Cl. ........................................ 369/75; 360/251
(58) Field of Search ................................ 360/75, 77.12, 360/78.02, 241, 241.1, 241.2, 241.3, 251

(56) References Cited

U.S. PATENT DOCUMENTS

| 4,460,932 A | * | 7/1984 | Osanai ....................... 360/251 |
| 5,831,798 A | * | 11/1998 | Muller et al. ............... 360/121 |
| 5,847,892 A | * | 12/1998 | Goker ..................... 360/77.12 |

* cited by examiner

Primary Examiner—Andrew L. Sniezek
Assistant Examiner—James L Habermehl
(74) Attorney, Agent, or Firm—Sughrue Mion, PLLC

(57) ABSTRACT

To provide a switchable type servo writer capable of writing a servo signal on different kinds of magnetic tapes, to thereby achieve improvement in productivity and reduction of cost. In running servo writer 10, pluralities of head blocks 1 that contain a writing head corresponding to the different kinds of magnetic tapes MT are placed on turret 2, and change of the head blocks 1 is enabled by rotation of the turret 2.

18 Claims, 4 Drawing Sheets

SERVO WRITER

TECHNICAL FIELD OF THE INVENTION

This invention relates to a servo writer, and relates to a switchable type servo writer capable of writing a servo signal on different kinds of magnetic tapes especially.

BACKGROUND OF THE INVENTION

A magnetic recorder is widely used as a recorder for recording and saving information. Such a magnetic recorder aims at raising a storage density of the information per unit area. For example, width of a magnetic record track is narrowed and improvement in track density is aimed at. Therefore, improvement in raising storage density is achieved by raising the machining accuracy of a traveling device of the magnetic recorder. However, if width of the magnetic record track is narrowed, it becomes difficult for a reproducing head to trace the magnetic record track completely when reproducing the recorded signal. Therefore, even if the improvement is achieved depending only on the machining accuracy of the traveling device of the magnetic recorder, it has limitations.

On the other hand, the latest high-density magnetic recorder incorporates the mechanism of a servo control by the servo track in addition to the same improvement as the traveling device of the conventional magnetic recorder. This enables the track on the magnetic recorder to be traced completely by controlling the position of the magnetic recording head or the reproducing head to the traveling magnetic recorder.

The magnetic recorder that uses such servo control records the servo pattern beforehand on the magnetic recorder. And the magnetic recording head and the reproducing head determine the position of the track on the basis of the servo pattern and trace the track. By the above, width of the track can be narrowed and increase in track density is achieved.

And in the magnetic recorder that uses such a servo control, it is important that correct servo pattern is formed on the magnetic recorder. In order to form a servo pattern on a magnetic recorder, a medium writing device of exclusive use, which is a servo writer, is used.

Standardized reproducing output must be secured for the record signal written on the magnetic recorder by such a servo writer, therefore, the servo signal writing head and the circuit, the reproducing head for inspection and the circuit have been adjusted so that the servo signal can be written on the magnetic tape of a specific kind (for example, the magnetic tape with same magnetic coercive force and magnetic layer thickness).

For this reason, when servo pattern is formed on different kinds of magnetic tapes, reattaching work and change of conditions are required for the servo signal writing head or its circuit and the reproducing head or its circuit. For this reason, the servo writer is needed to be stopped for a long time, involving a problem in respect of productivity and cost.

SUMMARY OF THE INVENTION

The present invention is proposed in view of the above-described problem, and object of this invention is to provide a switchable type servo writer capable of writing a servo signal on different kinds of magnetic tapes, to thereby achieve improvement in productivity and reduction of cost.

In order to overcome the above-described problem, this invention provides a servo writer for writing a servo signal on running magnetic tapes by a writing head, wherein in order to write the servo signal on different kinds of magnetic tapes, pluralities of head blocks that contain the writing head corresponding to the different kinds of magnetic tapes respectively are placed on a turret. And change of the head blocks is enabled by rotation of the turret.

With above constitution, in a servo writer of this invention, the writing head is easily exchangeable with the writing head corresponding to the appropriate magnetic tape by carrying out predetermined angle rotation of the turret, so that the head block may be fixed in a predetermined position. Therefore, it is not necessary to stop the servo writer for a long time. This contributes to raising the productivity of the servo signal writing on magnetic tapes and resultant cost reduction.

As for the servo writer of a second invention of this invention, the change of the head blocks is performed by carrying out 180-degree step rotation of the turret by a stepping motor.

With the above constitution, in a servo writer of this invention, the stepping motor carries out a 180 degree normal rotation or inverted rotation, to thereby turret 2 carries out 180 degree normal rotation or inverted rotation accordingly to stop. Therefore, two head blocks placed on the turret is switched with each other to thereby stop at a predetermined position. Also, as for the stepping motor having three head blocks placed on the turret, switch of the writing head is possible by carrying out 120-degree rotation. Further, as for the stepping motor having four head blocks, switch of the writing head is possible by carrying out 90-degree rotation.

PREFERRED EMBODIMENT OF THE INVENTION

Figure 1:
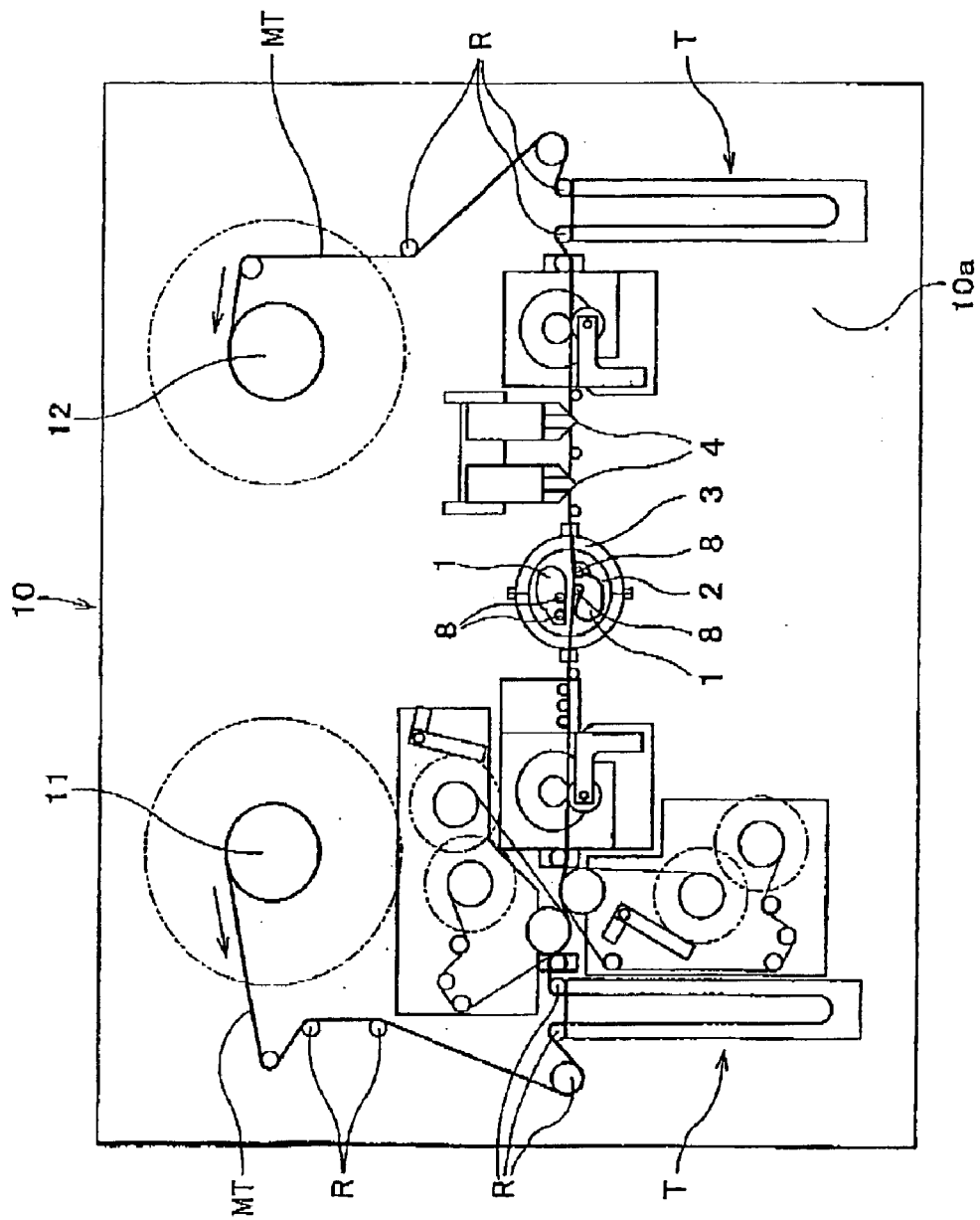
FIG. 1 is a front view of a servo writer according to a first embodiment of this invention.

Hereafter, preferred embodiment of the servo writer according to this invention will be explained with reference to the drawings. In the drawing for reference, FIG. 1 is a front view according to one embodiment of the servo writer of this invention.

As shown in the figure, the servo writer 10 includes feeding reel 11 for feeding magnetic tape MT and take-up reel 12 for taking up the magnetic tape MT from the feeding reel 11. On the downstream side of the feeding reel 11 and on the upstream side of the take-up reel 12, head blocks 1 including the respectively corresponding writing head is placed or fixed in pluralities, two in this invention, on a disk-shaped turret 2 so as to be freely rotatable in a 180 degree facing manner in order to write the servo signal on the magnetic tape MT. Support frame 3 for supporting the turret 2 so as to be freely rotated is formed in the outside of the turret 2.

Moreover, the inspection head (verification head) 4 for inspecting the servo signal written by the writing head is formed on the downstream side of the turret 2.

In addition, servo writer 10 includes various devices, such as a tension adjustment device (not shown) for adjusting the tension of the magnetic tape MT at a predetermined value, or tension detection device T, and guide roller R—for guiding the magnetic tape MT.

Figure 2:
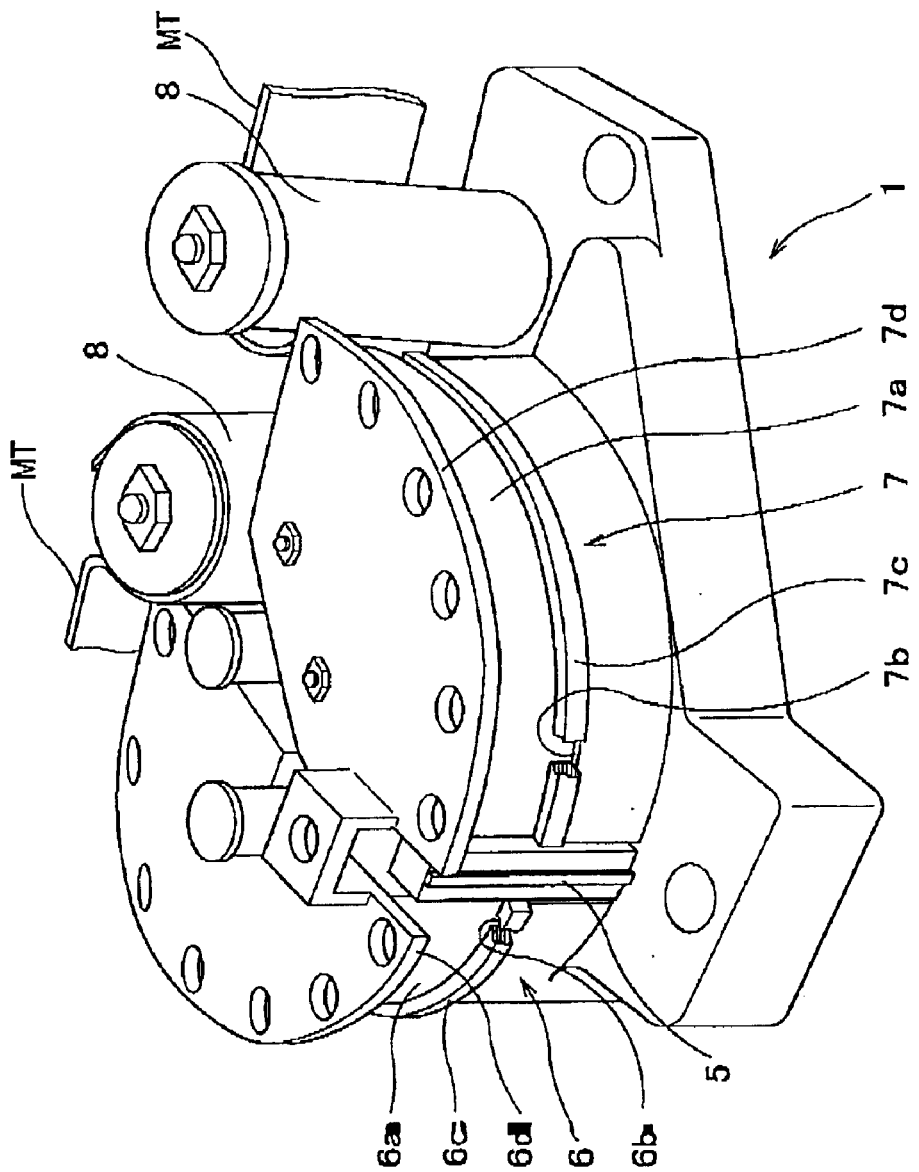
FIG. 2 is a perspective view of a head block including a writing head according to this invention.

Details of the head blocks 1 will be explained with reference to FIG. 2.

In addition, head blocks 1 include writing head 5 that writes the servo signal on the magnetic tape MT of specific kinds (for example, the tape with the same magnetic coercive force and magnetic layer thickness) and circuit. This embodiment includes two head blocks 1 for corresponding to two kinds of magnetic tapes. However, since a form and a function are the same, explanation will be given to one of them.

The writing head 5 that writes the servo signal on the magnetic tape MT is arranged in the head blocks 1, and the circuit of the writing head 5 is incorporated in the inside of the head block 1. Guide 6 and guide 7 are formed interposing the writing head 5 therebetween on the upstream side and downstream side of the writing head 5 so that the magnetic tape MT may run along the writing head 5.

Contacting face 6a and 7a with the magnetic tape MT of the guides 6 and 7 is formed into a circular arc so that record/reproduction face of the magnetic tape MT may slide smoothly, And in the upper end of the guide 6 and 7, flanges 6d and 7d are formed along the run direction of the magnetic tape MT. Rail-like contactors 6c and 7c made of resin are attached on end face of the guides 6 and 7 shown in the bottom of the figure, and guidance faces 6b and 7b that guide the bottom side edge (standard edge) of the magnetic tape MT are formed.

Guide rollers 8 and 8 of the magnetic tape MT that run along the guides 6 and 7, respectively are formed on the upstream side of the guide 6, and downstream side of the guide 7.

Figure 3:
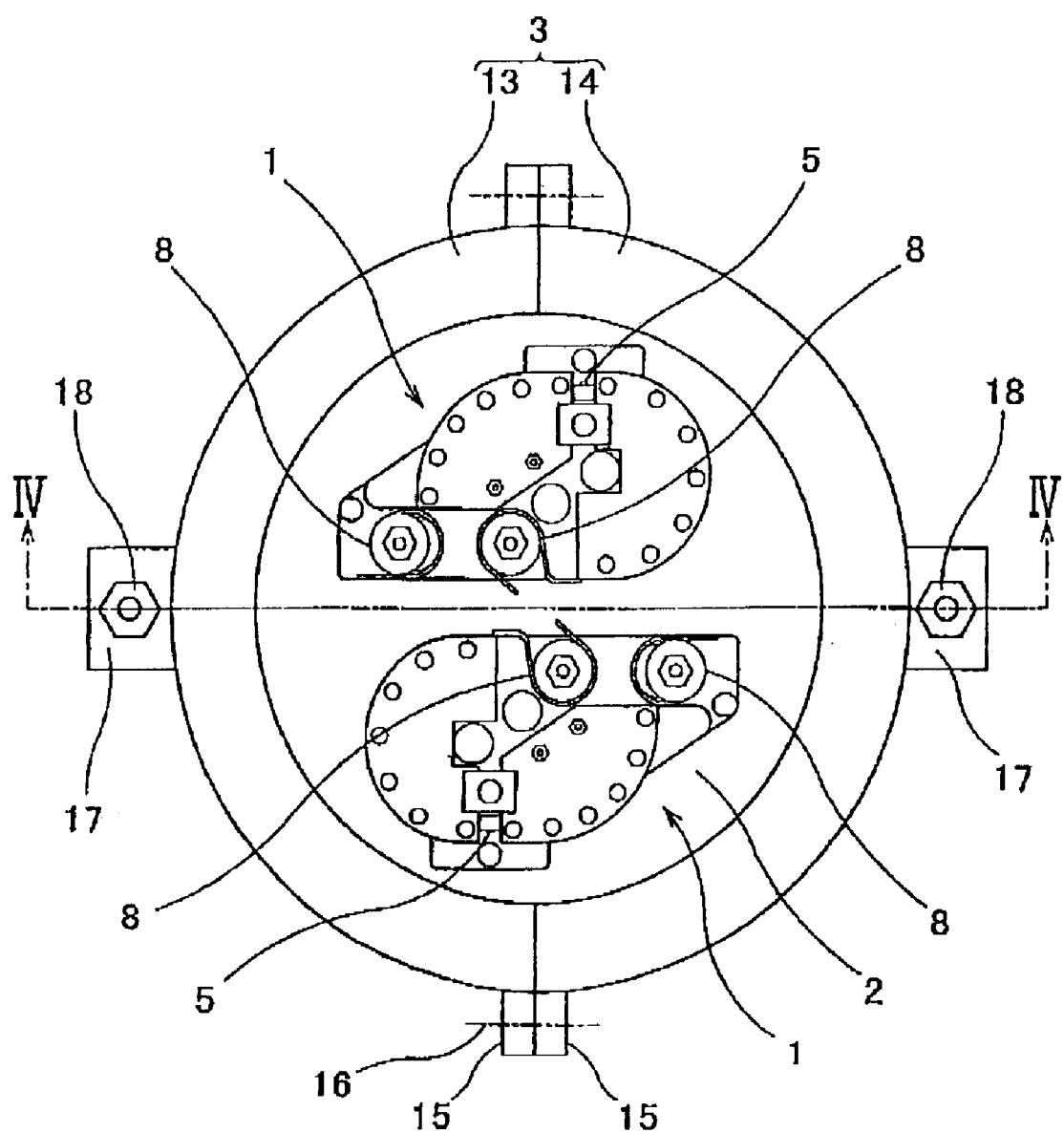
FIG. 3 is a plan view of a head block including a writing head according to this invention.
Figure 4:
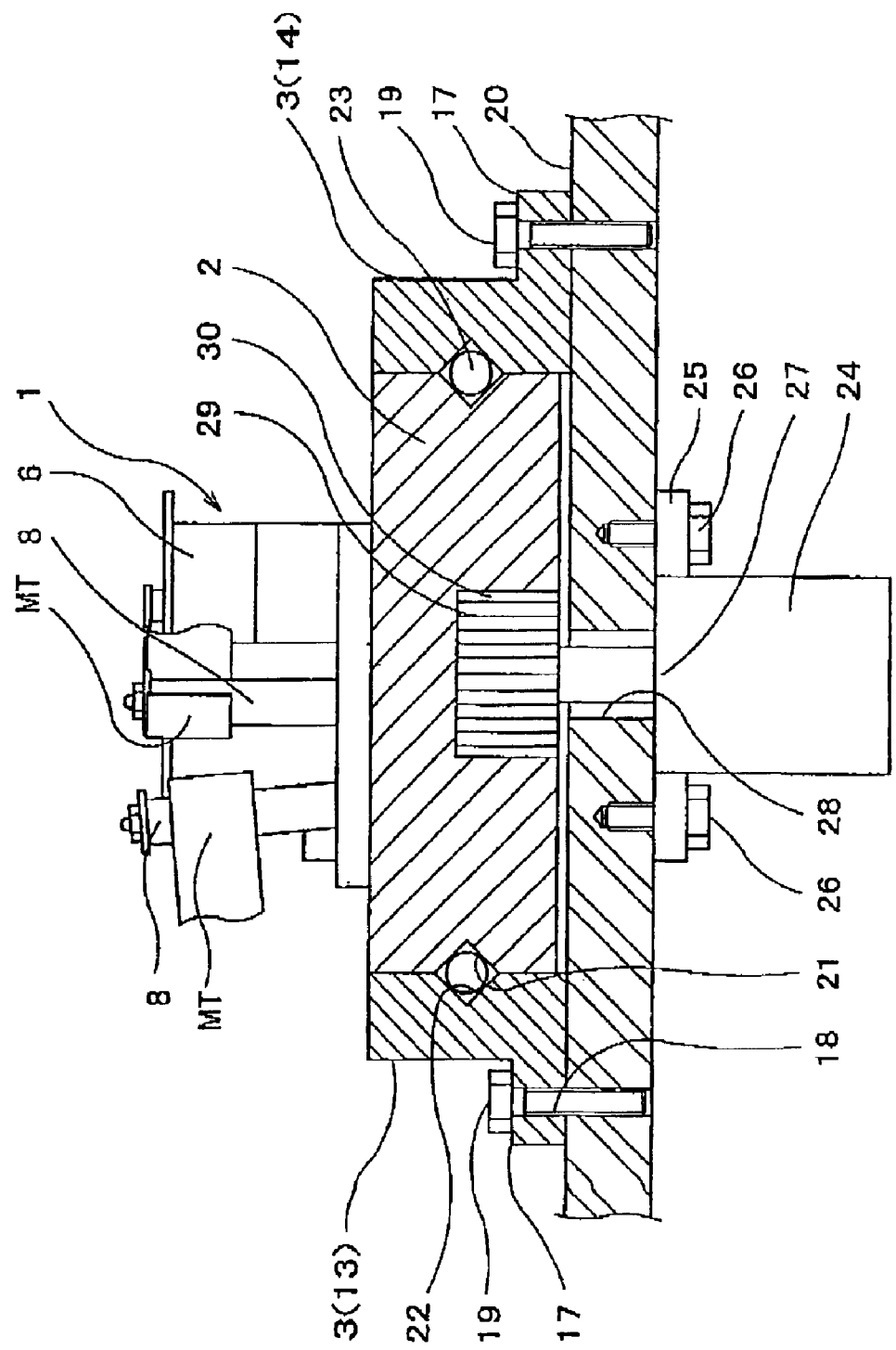
FIG. 4 is a sectional view taken along the line IV—IV of FIG. 3.

Turret 2 in which two head blocks 1 are placed at positions of 180 degree point symmetry is supported by the supporting frame 3, as shown in FIG. 3. The supporting frame 3 has substantially the same diameter with the turret 2, and consists of left frame member 13 and right frame member 14 of the same form. The left frame member 13 and the right frame member 14 include ear pieces 15 and 15 on the end face respectively, and the left frame member 13 and the right frame member 14 are made to butt against each other to be fixed by screw 16. Moreover, the left frame member 13 and the right frame member 14 include the fixed piece 17 between the ear piece 15 and the ear piece 15, respectively. As shown in FIG. 4, the supporting frame 3 is fixed to substrate 20 of servo writer 10 (see FIG. 1) by fitting screw 19 into fixed hole 18 formed in the fired piece 17.

As shown in FIG. 4, V groom 21 is formed all over the circumferential part of the turret 2. And the V groom 22 is formed also in the inside of the left frame member 13 of the supporting frame 3 which is facing the V groom 21 of the turret 2, and right frame member 14. Also, space that is square cross-sectionally is formed by two facing V grooms 21 and 22. Ball bearing 23 is fitted into this space, so that rotation of the turret 2 may be smooth about the support frame 3. The V groom 22 formed in the left frame member 13 and right frame member 14 of the support frame 3 is formed in three or more places in total at least, so that ball bearing 23 may press the turret 2 from at least three or more directions. When the turret 2 is stopped by the above constitution, the writing head 5 is positioned without rattling, to thereby fix the writing position of the servo signal on the magnetic tape MT.

Furthermore, for obtaining an easy rotation of the turret 2, the support frame 3 and the turret 2 are formed with hard metal, such as stainless steel, and the surface thereof is polished up beforehand.

Stepping motor 24 for rotating turret 2 is formed on the back face of the substrate 20, and flange 25 of the stepping motor 24 is fixed to the substrate 20 by screw 26. Moreover, hole 28 formed on the substrate 20 is made to penetrate the axis of rotation 27 of the stepping motor 20. And serration axis 29 formed in the tip part of the axis of rotation 27 is fitted into the serration hole 30 formed on the central part of the bottom of the turret 2, so that the turret 2 may carry out a step rotation by the stepping motor 24.

The stepping motor 24 is set up so that 180-degree step rotation (normal rotation or inverted rotation) may be carried out. Thereby, the turret 2 carries out a 180-degree normal rotation or inverted rotation to stop, therefore it becomes possible for the head blocks 1 on the turret 2 are switched to stop at a predetermined position. By the head blocks 1 that stop at a predetermined position, the writing head 5 (see FIG. 2) stops at a predetermined position and the servo signal corresponding to the conveyed magnetic tape MT is written.

Thus, only by carrying out 180-degree step rotation (normal rotation or inverted rotation) of the head blocks 1 to stop, the writing head can be switched easily. Therefore, the servo signal corresponding to the magnetic tape MT can be written without stopping the servo writer 10 for a long time, even if the kind of magnetic tape MT changes. This contributes to raising the productivity of the servo signal writing on the magnetic tape MT, and resultant cost reduction.

Incidentally, in this embodiment, it is explained that two head blocks 1 are placed on the turret 2. However, three or four head blocks 1 may be placed, and in this case, the head blocks 1 stop at the predetermined position by carrying out 120-degree or 90-degree step rotation of the stepping motor 24 respectively, and the servo signal corresponding to the kind of the magnetic tape MT can be written by the writing head 5.

Moreover, in this embodiment, explanation was given to the case where two different kinds of head blocks 1 were placed on the turret 2. However, the turret 2 where the two head blocks are placed can be the same one. With the composition described above, even if one of the head blocks 1 is deteriorated it becomes possible to exchange and use another new head block 1 immediately, without doing the work involving suspension of the servo writer 10 for a long time.

What is claimed is:

1. A servo writer that writes a servo signal by a writing head on running magnetic tapes, comprising:
    writing heads, wherein each of said writing heads writes a servo signal on a magnetic tape;
    head blocks, each of said head blocks having one of the writing heads and making the magnetic tape run along the one of the writing heads;
    a turret having the head blocks mounted thereon;
    a supporting frame that supports the turret so as to be rotatable; and
    a rotator that rotates the turret to enable change of the head blocks thereby.

2. A servo writer as described in claim 1, wherein the turret is provided so as to be freely rotatable.

3. A servo writer as described in claim 1, wherein the turret has two head blocks formed thereon, and the rotator rotates the turret in steps for every 180 degrees.

4. A servo writer as described in claim 1, wherein the turret has three head blocks formed thereon, and the rotator rotates the turret in steps for every 120 degrees.

5. A servo writer as described in claim 1, wherein the turret has four head blocks formed thereon, and the rotator rotates the turret in steps for every 90 degrees.

6. A servo writer as described in claim 1, wherein the head blocks are constituted including a pair of guides formed on upstream side and downstream side of the magnetic head, respectively.

7. A servo writer as described in claim 6, wherein a guide surface having the magnetic tape running thereon is formed into a circular arc over width direction of the magnetic tape.

8. A servo writer as described claim 7, wherein rail-like contactors made of resin are attached on the guide surface, so as to prevent positional deviation.

9. A servo writer as described claim 1, wherein a first V groove is formed on a side face of the turret, and a second V groove is formed on inner peripheral surface of the supporting frame, and when supporting the turret by the supporting frame, the supporting groove is formed by both of the first V groove and the second V groove.

10. A servo writer as described claim 9, wherein ball bearings are formed in the supporting frame.

11. A servo writer as described in claim 9, wherein at least three ball bearings are formed in the supporting frame.

12. A servo writer as described in claim 9, wherein the support frame and the turret are formed with hard metal.

13. A servo writer as described claim 12, wherein the support frame and the turret are formed with stainless steel.

14. A writing method of the servo signal for writing the servo signal on the magnetic tape, comprising:

head blocks, each of said head blocks having a writing head and making the magnetic tape run along the writing heads;

a turret having said head blocks mounted thereon;

a supporting frame that supports the turret so as to be rotatable; and a rotator that rotates the turret so that the head blocks may be changed over the magnetic tape.

15. A writing method of the servo signal for writing the servo signal on the magnetic tape, comprising a servo writer that writes a servo signal by a writing head on running magnetic tapes, said writing method comprising:

placing pluralities of head blocks that each contain a writing head on a turret, said writing heads corresponding to different kinds of magnetic tapes, respectively, and enabling a change of the head blocks by rotation of the turret.

16. A writing method of the servo signal for writing the servo signal on the magnetic tape, as described in claim 15, wherein head blocks can be changed to two by carrying out 180-degree step rotation of a turret by a stepping motor.

17. A writing method of the servo signal for writing the servo signal on the magnetic tape, as described in claim 16, wherein guides are formed into a circular arc interposing a head therebetween.

18. A servo writer that writes a servo signal by a writing head on running magnetic tapes, comprising:

writing heads, wherein each of said writing heads writes a servo signal on a magnetic tape;

head blocks, each of said head blocks having one of the writing heads and being formed with a pair of guides provided on upstream and downstream sides of the writing head, which make the magnetic tape run along the one of the writing heads;

a turret having two of said head blocks mounted thereon;

a supporting frame that supports the turret so as to be rotatable; and a rotator that rotates the turret in steps for every 180 degrees, to enable the head blocks to be changed over the magnetic tape;

wherein a guide surface of the guide having the magnetic tape running thereon is formed in a circular arc over a width direction of the magnetic tape, rail-like contactors made of resin are attached on the guide surface, so as to prevent positional deviation, a first V groove is formed on a side face of the turret, and a second V groove is formed on an inner peripheral surface of the supporting frame, and when supporting the turret by the supporting frame, the supporting groove is formed by both of the first V groove and the second V groove, and the turret is formed so as to be freely rotatable by ball bearings provided in the supporting groove.

* * * * *